United States Patent

[11] 3,634,601

[72] Inventor William Vito Pauza
Palmyra, Pa.
[21] Appl. No. 21,327
[22] Filed Mar. 20, 1970
[45] Patented Jan. 11, 1972
[73] Assignee AMP Incorporated
Harrisburg, Pa.

[54] STAKING ELECTRICAL CONTACT AND METHOD OF MAKING AN ELECTRICAL CONNECTOR
6 Claims, 5 Drawing Figs.

[52] U.S. Cl. .......... 174/68.5, 29/628, 85/49, 317/101 CC, 339/17 R, 339/95 R, 339/97 R
[51] Int. Cl. .......... H05k 1/04
[50] Field of Search .......... 174/68.5, 84, 88; 317/101 C, 101 CC; 339/17, 95, 97, 98; 85/49; 29/628

[56] References Cited

UNITED STATES PATENTS

| | | | |
|---|---|---|---|
| 461,177 | 10/1891 | Arnold | 85/49 |
| 1,562,681 | 11/1925 | Bonaly | 85/49 |
| 2,970,184 | 1/1961 | Blonder | 339/97 R X |
| 3,142,524 | 7/1964 | McDonough | 339/98 |
| 3,388,370 | 6/1968 | Elm | 339/98 |

*Primary Examiner*—Darrell L. Clay
*Attorneys*—Curtis, Morris and Safford, William J. Keating, Ronald D. Grefe, William Hintze, Adrian J. La Rue, Frederick W. Raring, Jay L. Seitchik and John P. Vandenburg

ABSTRACT: A staking electrical contact for staking an electrical conductor onto a printed circuit board and in electrical engagement with a printed circuit path on the printed circuit board which comprises a body portion having spaced legs between which the electrical conductor is disposed and the legs are driven into slot means of the printed circuit board until the contact is bottomed whereupon the free ends of the legs are bent into engagement with the printed circuit path and soldered thereto.

STAKING ELECTRICAL CONTACT AND METHOD OF MAKING AN ELECTRICAL CONNECTOR

This invention relates to an electrical contact and more particularly to an electrical contact for staking an electrical conductor onto a printed circuit board in electrical engagement with a printed circuit path thereon and the method for accomplishing such a connection.

In some applications, with respect to making electrical terminations onto printed circuit paths of printed circuit boards, it is desirable to make the terminations close to each other in order to provide high density and to provide assurance that the terminations are properly insulated from one another. It is also desirable, in some cases, that such terminations be made permanent to assure the fact that the terminations will not become loose and thereby provide spurious connections that disrupt the integrity of the continuity of the circuits formed by the terminations since such disruptions, in the case of computers, can be extremely disadvantageous.

An object, therefore, of the present invention is to provide a staking contact to stake an electrical conductor to a printed circuit board.

Another object is the provision of a staking contact that stakes a stripped end of an electrical conductor onto a printed circuit board.

A further object is to provide a staking contact that has means for penetrating the insulation of an electrical conductor as it is being staked onto a printed circuit board.

An additional object is the provision of means on the staking contact to limit insertion of the contact into slot means of a printed circuit board.

Still a further object is to provide spaced legs on the staking contact with the free ends thereof being bent into engagement with a printed circuit path on a printed circuit board and which are soldered thereto.

Still another object is the provision of an electrical connection between the staking contact, an electrical conductor and a printed circuit path of a printed circuit board and the method of making such an electrical connection. Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they modify it in various forms, each as may be best suited to the conditions of a particular use.

Figure 1:
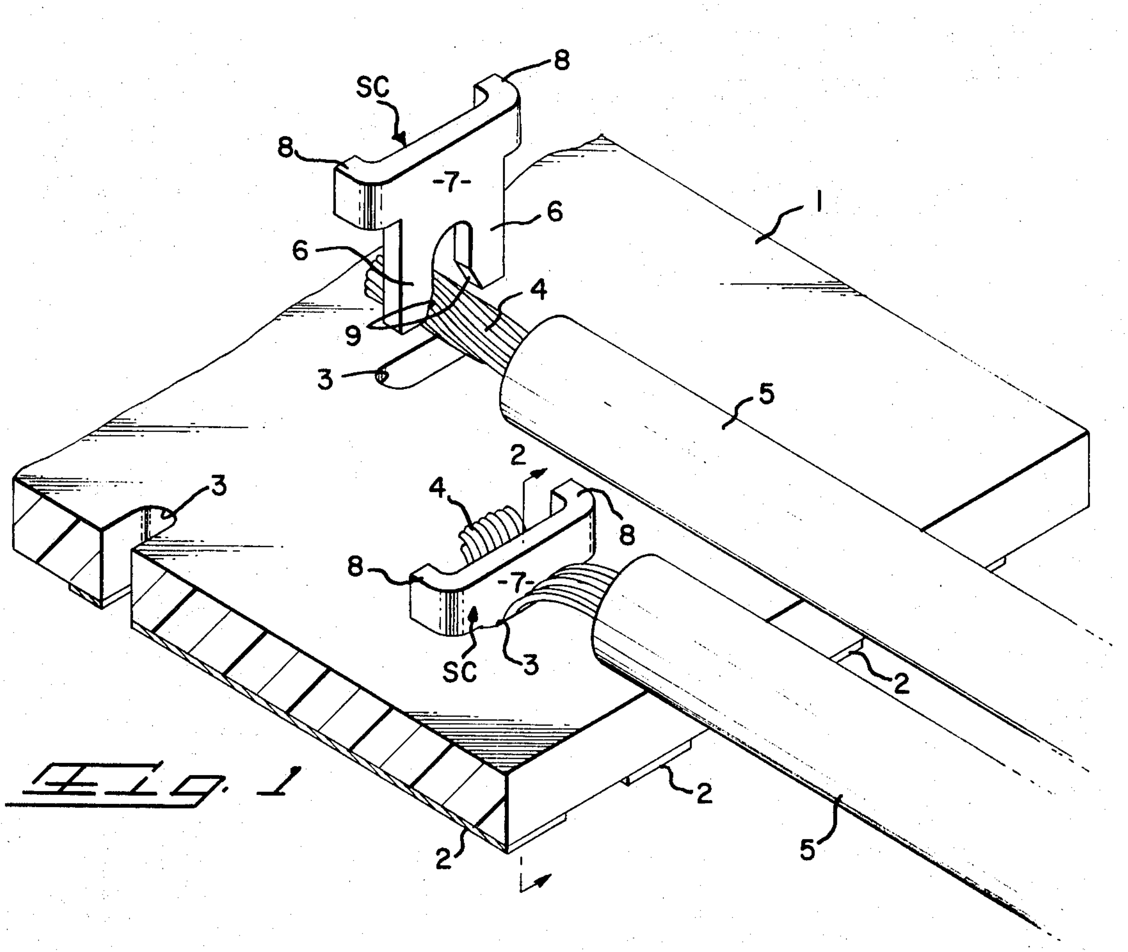
FIG. 1 is a perspective view of a printed circuit board illustrating a staked electrical connection and a staking contact exploded above a slot in the printed circuit board prior to staking an electrical conductor to the printed circuit board.
Figure 2:
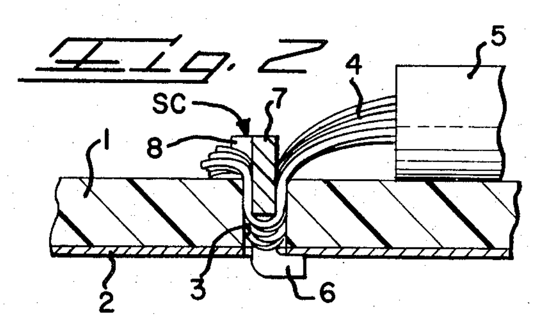
FIG. 2 illustrates a cross-sectional view of the staking contact in a staked position on a printed circuit board.
Figure 3:
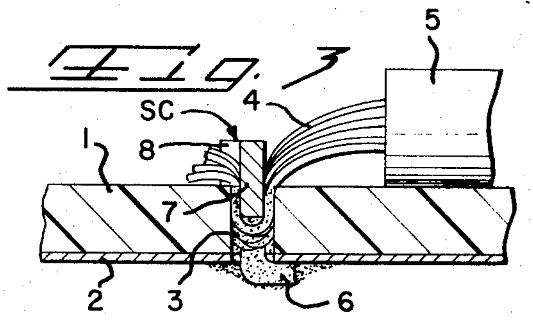
FIG. 3 is a view similar to FIG. 2 illustrating the staked contact soldered in position.
Figure 4:
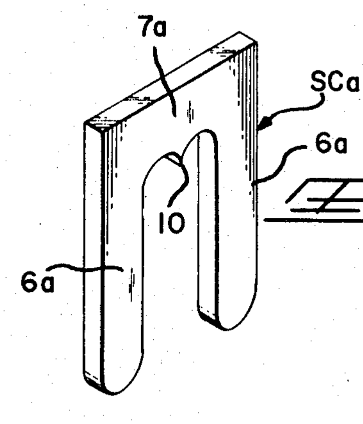
FIG. 4 is a perspective view of a modified embodiment of the invention.
Figure 5:
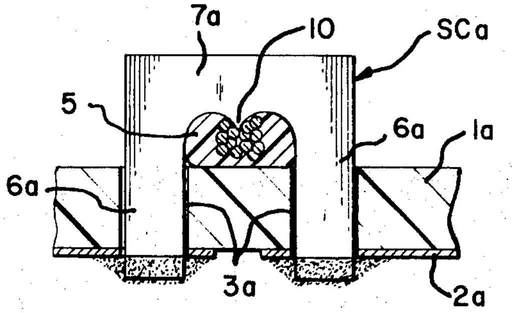

FIG. 5 illustrates the embodiment of FIG. 4 in a staked and soldered position on a printed circuit board. Turning now to the drawing and especially FIGS. 1–3, a printed circuit board 1 has spaced printed circuits paths 2 on one surface thereof. Staggered slots 3 are provided in the printed circuit board in alignment with respective circuit paths 2 in order to provide spacing for reasons of density.

A stripped end 4 of insulated electrical conductor 5 is placed over a slot 3, and spaced legs 6 extending outwardly from a body section 7 of staking contact SC are driven into slot 3 with stripped end 4 therebetween to stake the conductor to the printed circuit board. As can be discerned from FIGS. 2 and 3, the stripped end 4 is wedged into slot 3 via body section 7.

Arms 8 extend outwardly from body section 7 and preferably at an angle thereto in order to provide room for the adjacent conductors, and these arms engage the printed circuit board thereby preventing overinsertion of the staking contacts within slots 3.

After the staking contacts SC have staked the conductors to the printed circuit boards within slots 3, the free ends of arms 6 are bent into engagement with the printed circuit paths 2 and the printed circuit board is subjected to a soldering operation such as, for example, a flow-soldering technique, thereby soldering the conductors to the printed circuit paths. The wicking effect of the solder will also cause the stripped end 4 to be soldered to the contact.

The area between legs 6 is best referred to as a nest in which the stripped end 4 is nested when the staking contact is driven into the slots. Beveled surfaces 9 are provided on inner surfaces of the legs at an entrance to the nest to facilitate movement of stripped end 4 into the nest when the staking contact is driven into the slot.

FIGS. 4 and 5 illustrate staking contact SC*a* which is an embodiment of the invention. Staking contact SC*a* has a sharp barb 10 at the bottom of the nest so that it can penetrate the insulation of conductor 5 when legs 6*a* are driven into slots 3*a* in the printed circuit board 1*a* whereafter the free ends of legs 6*a* are bent into engagement with printed circuit path 2*a* and these free ends are soldered thereto as explained hereinabove.

The embodiment of FIGS. 4 and 5 precludes a stripping operation of the conductors, and the nest and barb 10 of the staking contact provides an effective strain relief for the connection. No arms are needed on body section 7*a* to prevent overinsertion, because the staking contact drives the insulated conductor against the printed circuit board and for this reason two separate slots 3*a* are used to accept the legs 6*a*.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. An electrical connection comprising a printed circuit board having printed circuit path means on one surface and slot means therein in communication with said printed circuit path means, electrical conductor means extending across another surface of said printed circuit board and across said slot means, electrical contact means having spaced leg means disposed on opposite sides of said electrical conductor and extending through said slot means and body section means in electrical engagement with said electrical conductor means, and free end means of said contact means in electrical engagement with said printed circuit path means.

2. An electrical connection according to claim 1 wherein said electrical conductor means is an insulated wire and has a stripped end in electrical wedging engagement with said body section means in said slot means.

3. An electrical connection according to claim 1 wherein said body section means include arm means in engagement with the said another surface of said printed circuit board preventing said contact means from being overinserted in said slot means.

4. An electrical connection according to claim 1 wherein said electrical conductor means is an insulated wire and said slot means are spaced slot means accommodating said spaced leg means and said body section means includes barb means penetrating the insulation of said conductor means.

5. An electrical connection according to claim 1 wherein said free end means are bent into engagement with said printed circuit path means.

6. An electrical connection according to claim 5 wherein said free ends are soldered to said printed circuit means.

* * * * *